(12) United States Patent
Koike

(10) Patent No.: US 7,593,044 B2
(45) Date of Patent: Sep. 22, 2009

(54) IMAGE PICKUP APPARATUS, CONTROL METHOD THEREFOR, AND CONTROL PROGRAM FOR IMPLEMENTING THE CONTROL METHOD

(75) Inventor: Toru Koike, Setagaya-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 630 days.

(21) Appl. No.: 11/216,698

(22) Filed: Aug. 31, 2005

(65) Prior Publication Data
US 2006/0044470 A1    Mar. 2, 2006

(30) Foreign Application Priority Data
Sep. 1, 2004    (JP)    ............... 2004-254455

(51) Int. Cl.
H04N 5/76    (2006.01)
H04N 7/00    (2006.01)

(52) U.S. Cl. .................... 348/231.2; 348/552

(58) Field of Classification Search .. 348/231.99–231.9
See application file for complete search history.

(56) References Cited

U.S. PATENT DOCUMENTS

| | | | |
|---|---|---|---|
| 5,124,789 A * | 6/1992 | Hiyama et al. | 348/74 |
| 7,082,288 B2 * | 7/2006 | Hosoi | 455/78 |
| D535,023 S * | 1/2007 | Smart et al. | D24/110.1 |
| 2003/0095280 A1 | 5/2003 | Sunada et al. | |
| 2003/0137591 A1 * | 7/2003 | Sagiya | 348/222.1 |
| 2004/0051807 A1 * | 3/2004 | Niwa | 348/372 |

FOREIGN PATENT DOCUMENTS

| | | |
|---|---|---|
| CN | 1206981 A | 2/1999 |
| JP | 2000-76302 A | 3/2000 |
| WO | 99/22318 A1 | 5/1999 |

OTHER PUBLICATIONS

Office Action issued in corresponding Chinese patent application No. 2005-100982519, mailed Apr. 27, 2007.
Japanese translation for Chinese Office Action mailed Apr. 27, 2007; NPL cite No. 1.
Relevant Portion of European Search Report of European Application No. 05255338.5-2202 dated Jul. 27, 2006.

* cited by examiner

*Primary Examiner*—Nhan T Tran
*Assistant Examiner*—Amy Hsu
(74) *Attorney, Agent, or Firm*—Rossi, Kimms & McDowell, LLP (57) ABSTRACT

An image pickup apparatus which is capable of interrupting a data searching process quickly without detecting a user pressing a search interruption button. A system controller circuit carries out a searching process for searching least one desired data from a plurality of data stored in a nonvolatile memory or a memory card. When a change-of-status of the image pickup apparatus is detected, for example, when a shutter button has been pressed halfway, the system controller circuit interrupts the searching process and executes an interruption process.

10 Claims, 7 Drawing Sheets

IMAGE PICKUP APPARATUS, CONTROL METHOD THEREFOR, AND CONTROL PROGRAM FOR IMPLEMENTING THE CONTROL METHOD

BACKGROUND OF THE INVENTION

1. Field of the Invention

The present invention relates to an image pickup apparatus, a control method therefor, and a control program for implementing the control method, and in particular, to an image pickup apparatus provided with a function of storing image data and retrieving desired image data from the stored image data, a control method therefor, and a control program for implementing the control method.

2. Description of the Related Art

There have been conventionally known image pickup apparatuses provided with a function of storing image data of a shot image in a storage device and retrieving desired image data from the image data stored in the storage device. For example, there has been proposed an electronic still camera capable of retrieving desired image data from image data stored in a storage device, using a picture image input by drawing, as a search key image (refer to, for example, Japanese Laid-Open Patent Publication (Kokai) No. 2000-076302). In this electronic still camera, a searching process is carried out by inputting by drawing a picture-image characteristic of desired image data to the electronic still camera, and sequentially comparing the inputted picture image with a plurality of image data stored in the storage device to retrieve image data, which has a high degree of similarity with the inputted picture image, from the plurality of image date stored in the storage device, as a search result image.

In the conventional electronic still camera, however, when an interruption process such as shooting, data communication, replacement of a memory card, switching of a shooting mode, replacement of a battery, a cross key operation is carried out during the searching process, the user is required to press a search interruption button to interrupt the searching process and then start the above-mentioned interruption process. Therefore, the user feels troublesome to carry out the operation. In particular, when the user shoots during the searching process, the user has to press the search interruption button to interrupt the searching process and then press a shutter button to start shooting. Consequently, the user might miss a shutter chance.

Moreover, when a working memory is shared by the searching process and the interruption process, if the user does not manually store a search key image and a search result image in another storage device before the user interrupts the searching process, after the interruption process is terminated, the user has to again input the search key image and the search result image to carry out the searching process again from the onset.

SUMMARY OF THE INVENTION

It is an object of the present invention to provide an image pickup apparatus and a control method therefor, which are capable of interrupting a data searching process quickly without detecting a user pressing a search interruption button, and a control program for implementing the control method.

To attain the above object, in a first aspect of the present invention, there is provided an image pickup apparatus comprising a data storage device that stores a plurality of data, a searching device that carries out a searching process for searching at least one desired data from the plurality of data stored in the data storage device, a change-of-status detecting device that detects a change of status of the image pickup apparatus, and an interruption process executing device that is operable when the change of status of the image pickup apparatus is detected by the change-of-status detecting device, to interrupt the searching process carried out by the searching device and execute an interruption process.

According to the present invention, when a change-of-status of the image pickup apparatus such as a shooting start instructing device having been pressed halfway, an information input device having been pressed, a storage cover having been opened, or a communication cable having been mounted is detected, the searching process for searching data is interrupted and the interruption process is executed. As a result, it is possible to interrupt the searching process for searching data without detecting the user pressing the search interruption button.

To attain the above object, in a second aspect of the present invention, there is provided an image pickup apparatus comprising a data storage device that stores a plurality of data, a searching device that carries out a searching process for searching at least one desired data from the plurality of data stored in the data storage device, a shooting start instructing device that instructs start of shooting, a pressing state detecting device that detects a pressing state of the shooting start instructing device, and an interruption process executing device that is operable when the pressing state detecting device detects that the shooting start instructing device has been pressed halfway, to interrupt the searching process carried out by the searching device and execute an interruption process.

Preferably, the image pickup apparatus according to the second aspect of the present invention comprises an interruption and searching storage device that is shared as a working memory by the interruption process and by the searching process, and an interruption information storage device that stores interrupted searching process information relating to the interrupted searching process, and the interruption process executing device is operable when the searching process is interrupted, to save the interrupted searching process information stored in the interruption and searching storage device, in the interruption information storage device and use the interruption and searching storage device for the interruption process.

More preferably, the image pickup apparatus according to the second aspect of the present invention comprises a saving processing completion determining device that determines whether or not saving processing for saving the interrupted searching process information in the interruption information storage device is completed within a predetermined time, a copying device that is operable when the saving processing is completed within the predetermined time, to copy the interrupted searching process information saved in the interruption information storage device, to the interruption and searching storage device, and a restarting device that restarts the interrupted searching process based on the interrupted searching process information copied to the interruption and searching storage device.

To attain the above object, in a third aspect of the present invention, there is provided an image pickup apparatus comprising a data storage device that stores a plurality of data, a searching device that carries out a searching process for searching at least one desired data from the plurality of data stored in the data storage device, an information input device that inputs information, a pressing state detecting device that detects a pressing state of the information input device, and an interruption process executing device that is operable when the pressing state detecting device detects that the information input device has been pressed, to interrupt the searching process carried out by the searching device and execute an interruption process.

Preferably, the image pickup apparatus according to the third aspect of the present invention comprises an interruption and searching storage device that is shared as a working memory by the interruption process and by the searching process, and an interruption information storage device that stores interrupted searching process information relating to the interrupted searching process, and the interruption process executing device is operable when the searching process is interrupted, to save the interrupted searching process information stored in the interruption and searching storage device, in the interruption information storage device and use the interruption and searching storage device for the interruption process.

More preferably, the image pickup apparatus according to the third aspect of the present invention comprises a copying device that is operable when the pressing state detecting device detects that the information input device has not been pressed, to copy the interrupted searching process information saved in the interruption information storage device, to the interruption and searching storage device, and a restarting device that restarts the interrupted searching process based on the interrupted searching process information copied to the interruption and searching storage device.

To attain the above object, in a fourth aspect of the present invention, there is provided an image pickup apparatus comprising a data storage device that stores a plurality of data, a searching device that carries out a searching process for searching at least one desired data from the plurality of data stored in the data storage device, a storage device that stores at least one of a memory card and a battery, a storage cover that covers the storage device, an opening and closing detecting device that detects opening and closing of the storage cover, and an interruption process executing device that is operable when the opening and closing detecting device detects that the storage cover has been opened, to interrupt the searching process carried out by the searching device and execute an interruption process.

Preferably, the image pickup apparatus according to the fourth aspect of the present invention comprises an interruption and searching storage device that is shared as a working memory by the interruption process and by the searching process, and an interruption information storage device that stores interrupted searching process information relating to the interrupted searching process, and the interruption process executing device is operable when the searching process is interrupted, to save the interrupted searching process information stored in the interruption and searching storage device, in the interruption information storage device and use the interruption and searching storage device for the interruption process.

More preferably, the image pickup apparatus according to the fourth aspect of the present invention comprises a copying device that is operable when the opening and closing detecting device detects that the storage cover has been closed, to copy the interrupted searching process information saved in the interruption information storage device, to the interruption and searching storage device, and a restarting device that restarts the interrupted searching process based on the interrupted searching process information copied to the interruption and searching storage device.

To attain the above object, in a fifth aspect of the present invention, there is provided an image pickup apparatus comprising: a data storage device that stores a plurality of data, a searching device that carries out a searching process for searching at least one desired data from the plurality of data stored in the data storage device, a communication cable mounting device that mounts a communication cable for performing data communications, a mounting and dismounting detecting device that detects mounting and dismounting of the communication cable onto and from the communication cable mounting device, and an interruption process executing device that is operable when the mounting and dismounting detecting device detects that the communication cable has been mounted, to interrupt the searching process carried out by the searching device and execute an interruption process.

Preferably, the image pickup apparatus according to the fifth aspect of the present invention comprises an interruption and searching storage device that is shared as a working memory by the interruption process and by the searching process, and an interruption information storage device that stores interrupted searching process information relating to the interrupted searching process, and the interruption process executing device is operable when the searching process is interrupted, to save the interrupted searching process information stored in the interruption and searching storage device, in the interruption information storage device and use the interruption and searching storage device for the interruption process.

More preferably, the image pickup apparatus according to the fifth aspect of the present invention comprises a copying device that is operable when the pressing state detecting device detects that the mounting and dismounting detecting device detects that the communication cable has been dismounted, to copy the interrupted searching process information saved in the interruption information storage device, to the interruption and searching storage device, and a restarting device that restarts the interrupted searching process based on the interrupted searching process information copied to the interruption and searching storage device.

To attain the above object, in a sixth aspect of the present invention, there is provided a control method for an image pickup apparatus including a data storage device that stores a plurality of data, comprising a searching step of carrying out a searching process for searching at least one desired data from the plurality of data stored in the data storage device, a change-of-status detecting step of detecting a change-of-status of the image pickup apparatus, and an interruption process executing step of interrupting the searching process carried out in the searching step and executing an interruption process when the change-of-status of the image pickup apparatus is detected in the change-of-status detecting step.

To attain the above object, in a seventh aspect of the present invention, there is provided a control method for an image pickup apparatus including a data storage device that stores a plurality of data, and a shooting start instructing device that instructs start of shooting, comprising a searching step of carrying out a searching process for searching at least one desired data from the plurality of data stored in the data storage device, a pressing state detecting step of detecting a pressing state of the shooting start instructing device, and an interruption process executing step of interrupting the searching process carried out in the searching step and executing an interruption process when it is detected in the pressing state detecting step that the shooting start instructing device has been pressed halfway.

To attain the above object, in an eighth aspect of the present invention, there is provided a control method for an image pickup apparatus including a data storage device that stores a plurality of data, and an information input device that inputs information, comprising a searching step of carrying out a searching process for searching at least one desired data from the plurality of data stored in the data storage device, a pressing state detecting step of detecting a pressing state of the information input device, an interruption process executing step of interrupting the searching process carried out in the searching step and executing an interruption process when it is detected in the pressing state detecting step that the information input device has been pressed.

To attain the above object, in a ninth aspect of the present invention, there is provided a control method for an image pickup apparatus including a data storage device that stores a plurality of data, a storage device that stores at least one of a memory card and a battery, and a storage cover that covers the storage device, comprising a searching step of carrying out a searching process for searching at least one desired data from the plurality of data stored in the data storage device, an opening and closing detecting step of detecting opening and closing of the storage cover, and an interruption process executing step of interrupting the searching process carried out in the searching step and executing an interruption process when it is detected in the opening and closing detecting step that the storage cover has been opened.

To attain the above object, in a tenth aspect of the present invention, there is provided a control method for an image pickup apparatus including a data storage device that stores a plurality of data, a communication cable mounting device that mounts a communication cable for performing data communications, comprising a searching step of carrying out a searching process for searching at least one desired data from the plurality of data stored in the data storage device, a mounting and dismounting detecting step of detecting mounting and dismounting of the communication cable onto and from to the communication cable mounting device, and an interruption process executing step of interrupting the searching process carried out in the searching step and executing an interruption process when it is detected in the mounting and dismounting detecting step that the communication cable has been mounted.

To attain the above object, in an eleventh aspect of the present invention, there is provided a control program executed by an image pickup apparatus including a data storage device that stores a plurality of data, comprising a searching module for carrying out a searching process for searching at least one desired data from the plurality of data stored in the data storage device, a change-of-status detecting module for detecting a change-of-status of the image pickup apparatus, and an interruption process executing module for interrupting the searching process carried out by the searching module and executing an interruption process when the change-of-status of the image pickup apparatus is detected by the change-of-status detecting module.

To attain the above object, in a twelfth aspect of the present invention, there is provided a control program executed by an image pickup apparatus including a data storage device that stores a plurality of data, and a shooting start instructing device that instructs start of shooting, comprising a searching module for carrying out a searching process for searching at least one desired data from the plurality of data stored in the data storage device, a pressing state detecting module for detecting a pressing state of the shooting start instructing device, and an interruption process executing module for interrupting the searching process carried out by the searching module and executing an interruption process when it is detected by the pressing state detecting module that the shooting start instructing device has been pressed halfway.

To attain the above object, in a thirteenth aspect of the present invention, there is provided a control program executed by an image pickup apparatus including a data storage device that stores a plurality of data, and an information input device that inputs information, comprising a searching module for carrying out a searching process for searching at least one desired data from the plurality of data stored in the data storage device, a pressing state detecting module for detecting a pressing state of the information input device, an interruption process executing module for interrupting the searching process carried out by the searching module and executing an interruption process when it is detected in the pressing state detecting module that the information input device has been pressed.

To attain the above object, in a fourteenth aspect of the present invention, there is provided a control program executed by an image pickup apparatus including a data storage device that stores a plurality of data, a storage device that stores at least one of a memory card and a battery, and a storage cover that covers the storage device, comprising a searching module for carrying out a searching process for searching at least one desired data from the plurality of data stored in the data storage device, an opening and closing detecting module for detecting opening and closing of the storage cover, and an interruption process executing module for interrupting the searching process carried out by the searching module and executing an interruption process when it is detected by the opening and closing detecting module that the storage cover has been opened.

To attain the above object, in a fifteenth aspect of the present invention, there is provided a control program executed by an image pickup apparatus including a data storage device that stores a plurality of data, a communication cable mounting device that mounts a communication cable for performing data communications, comprising a searching module for carrying out a searching process for searching at least one desired data from the plurality of data stored in the data storage device, a mounting and dismounting detecting module for detecting mounting and dismounting of the communication cable onto and from to the communication cable mounting device, and an interruption process executing module for interrupting the searching process carried out by the searching module and executing an interruption process when it is detected by the mounting and dismounting detecting module that the communication cable has been mounted.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing a preferred embodiment thereof.

Figure 1:
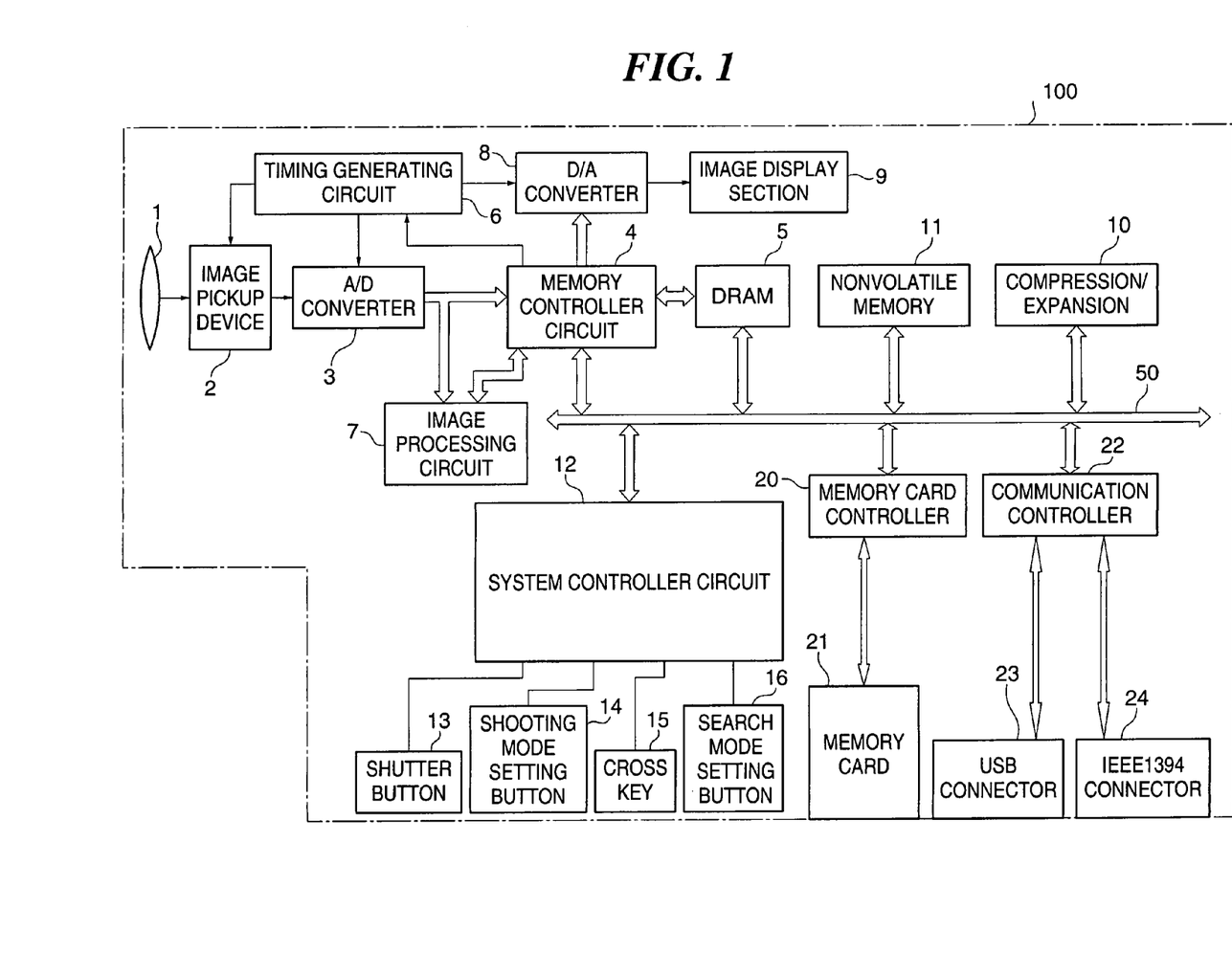
FIG. 1 is a block diagram showing the internal configuration of a digital camera as an image pickup apparatus according to an embodiment of the present invention.

FIG. 1 is a block diagram showing the internal configuration of a digital camera as an image pickup apparatus according to an embodiment of the present invention.

In FIG. 1, the digital camera 100 as the image pickup apparatus according to the present embodiment is comprised of: a shooting lens 1 for forming an optical image on an image pickup device 2; the image pickup device 2 for converting the optical image into an analog signal; an A/D converter 3 connected to the image pickup device 2, for converting the analog signal outputted from the image pickup device 2 into digital image data; an image processing circuit 7 for subjecting the image data to image processing; a DRAM 5 which temporarily stores shot image data and the like ed and is used as a working memory for various processing; a nonvolatile memory 11 which stores image data and the like; and a memory controller circuit 4 for controlling the output and input of image data from and to the DRAM 5 or the nonvolatile memory 11.

The digital camera 100 is further comprised of: a D/A converter 8 for converting the image data stored in the DRAM 5 or the nonvolatile memory 11 into an analog signal to be displayed the same on an image display section 9; the image display section 9 implemented by a TFT, a LCD, or the like and connected to the D/A converter 8; a timing generating circuit 6 for supplying a clock signal and a control signal to the image pickup device 2, the A/D converter 3 and the D/A converter 8; a compression and expansion circuit 10 for compressing and expanding image data; a system controller circuit 12 for controlling the entire digital camera 100; a memory card controller 20 for controlling the output and input of image data from and to a memory card 21; and a communication controller 22 for controlling communications with external devices connected to the digital camera 100 via a USB connector 23 or an IEEE1394 connector 24.

The memory controller circuit 4, the DRAM 5, the compression and expansion circuit 10, the nonvolatile memory 11, the system controller circuit 12, the memory card controller 20, and the communication controller 22 are connected to each other via a system bus 50.

The digital camera 100 is still further comprised of: a shutter button 13 for causing the digital camera 100 to start AF control and shooting; a shooting mode setting button 14 for setting a shooting mode such as a moving image mode/a still image mode or a continuous shooting mode/a single shooting mode; a cross key 15 for selecting a menu displayed on the image display section 9, for moving a pointer displayed on the image display section 9, and for setting various kinds of image pickup parameters at the time of shooting; and a search mode setting button 16 for setting a search mode in which a searching process for searching desired image data from among the image data stored in the nonvolatile memory 11 or the memory card 21 is automatically interrupted and restarted. These components are connected to the system controller circuit 12.

The image processing circuit 7 is connected to the A/D converter 3 and the memory controller circuit 4 and performs image processing such as pixel interpolation and color conversion on data from the A/D converter 3 or data from the memory controller circuit 4.

The DRAM 5 has its power supply backed up by a battery or the like so that even if the main power supply of the digital camera 100 is turned off, data stored in the DRAM is retained.

The nonvolatile memory 11 is for storing still image data or moving image data, which are obtained by shooting, and a program code for controlling the digital camera 100, and has a capacity large enough to store still image data of up to a predetermined number of frames and moving image data of up to a predetermined period of time. Therefore, even in the cases of a continuous shooting of continuously shooting a plurality of frames of still image data and a panoramic shooting, a large amount of image data can be stored in the nonvolatile memory 11 at high speed.

The D/A converter 8 converts the image data stored in the DRAM 5 or the nonvolatile memory 11 into an analog signal to be displayed on the image display section 9. By sequentially displaying image data obtained by shooting on the image display section 9, an electronic finder function can be realized. The system controller circuit 12 can turn on or off the display of the image display section 9 as desired according to an instruction inputted from an input section (not shown), and when the display of the image display section 9 is turned off, the power consumption of the digital camera 100 can be reduced by a large amount.

The compression and expansion circuit 10 reads image data stored in the DRAM 5 or the nonvolatile memory 11 and carries out compression or expansion on the data by discreet cosine transformation (DCT) or the like and stores the compressed or expanded image data in the DRAM 5 or the nonvolatile memory 11.

The memory controller circuit 4 is connected to the A/D converter 3, the DRAM 5, the timing generating circuit 6, the image processing circuit 7, and the D/A converter 8, and controls the A/D converter 3, the DRAM 5, the timing generating circuit 6, the image processing circuit 7, the D/A converter 8, the compression and expansion circuit 10, and the nonvolatile memory 11. The image data outputted from the A/D converter 3 is stored in the DRAM 5 or the nonvolatile memory 11 via the image processing circuit 7 and the memory controller circuit 4 or directly via the memory controller circuit 4.

The timing generating circuit 6 is connected to the memory controller circuit 4, the image pickup device 2, the A/D converter 3, and the D/A converter 8, and supplies a clock signal and a control signal to the image pickup device 2, the A/D converter 3, and the D/A converter 8 under the control of the memory controller circuit 4 and the system controller circuit 12.

The memory card 21 is a removable storage medium equipped with a nonvolatile memory having a capacity large enough to store image data and the like, and is implemented by a compact flash (registered trademark) card, a SD card, a MMC card, a memory stick card, a XD card, a PC card, a micro drive card, or the like.

The communication controller 22 includes a USB controller (not shown) connected to a USB connector 23, and an IEEE1394 controller (not shown) connected to the IEEE1394 connector 24. The communication controller 22 is connected to external devices (not shown) having a USB interface or an IEEE1394 interface via the USB connector 23 or the IEEE1394 connector 24, respectively, and controls communications by the communication protocol of USB or IEEE1394 with the external devices connected thereto.

The system controller circuit 12 detects the states of the shutter button 13, the shooting mode setting button 14, the cross key 15, and the search mode setting button, and carries out operations according to results of the detection.

When the shutter button 13 is pressed halfway, the system controller circuit 12 performs AF control. When the shutter button 13 is fully pressed, the system controller circuit 12 controls the memory controller circuit 4 to store the image data outputted from the A/D converter 3 in the DRAM 5 or the nonvolatile memory 11, to thereby perform shooting.

Figure 2:
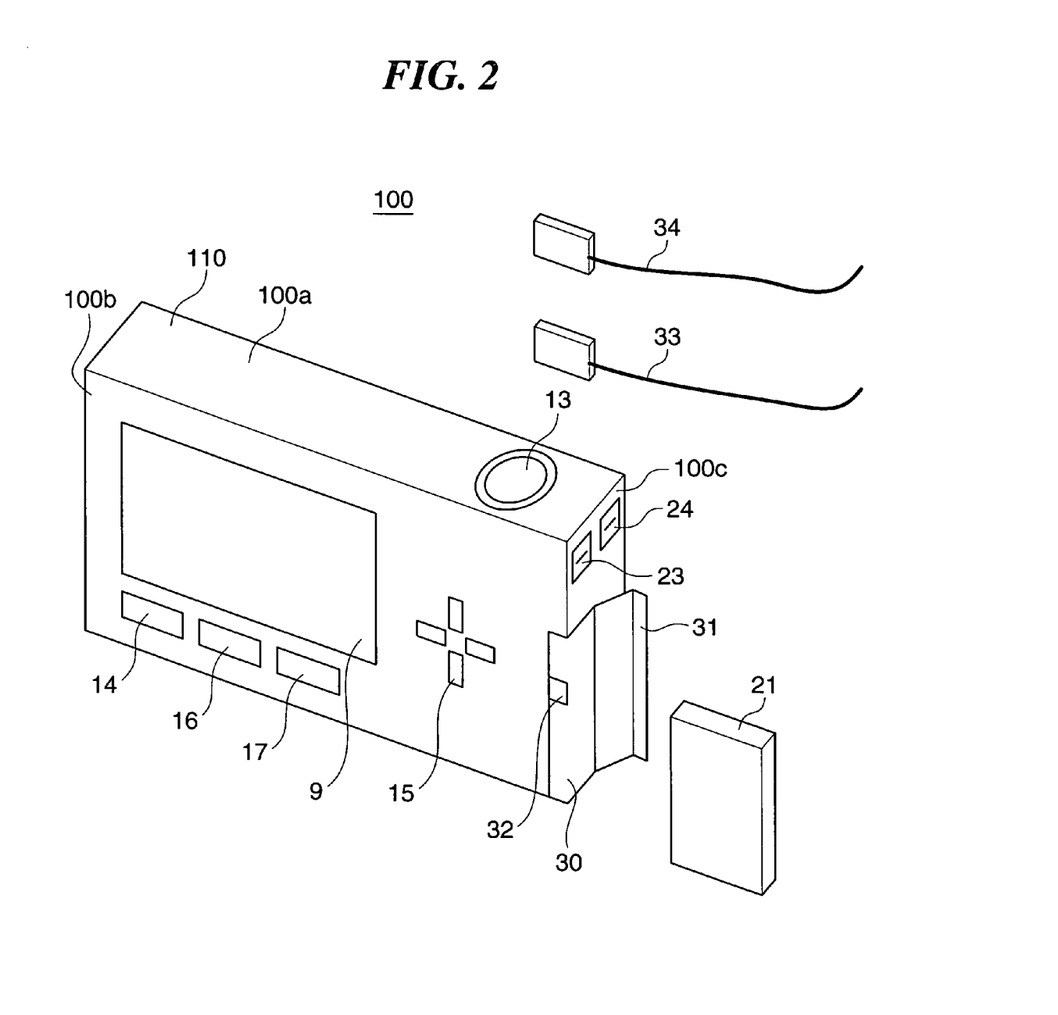
FIG. 2 is a perspective view showing the external appearance of the digital camera in FIG. 1.

FIG. 2 is a perspective view showing the external appearance of the digital camera 100 in FIG. 1.

As shown in FIG. 2, the digital camera 100 is comprised of a generally rectangular casing 100 in the form of a having a top surface 100a, a back surface 100b, a left side surface (not shown), and a right side surface 100c. The top surface 100a has the shutter button 13 provided thereon.

The back surface 100b has provided thereon the image display section 9, the shooting mode setting button 14, the cross key 15, the search mode setting button 16, and a pixel number and compression ratio setting button 17 for setting the number of pixels and compression ratio of image data to be stored in the DRAM 5 or the nonvolatile memory 11.

The right side surface 100c has provided thereon the USB connector 23, the IEEE1394 connector 24, a memory card slot 30 in which the memory card 21 is stored, a memory card cover 31 that covers the memory card slot 30, and a detection switch 32 that detects the memory card cover 31 being opened or closed.

A USB cable 33 having a USB plug and an IEEE1394 cable 34 having an IEEE1394 plug are connected to the USB connector 23 and the IEEE1394 connector 24, respectively. Therefore, the digital camera 100 can be connected to external devices (not shown) such as a PC, a printer, a storage device, a cellular phone, and a PDA. The communication controller 22 detects the levels of signals inputted to and outputted from pins in the USB connector 23 and the IEEE1394 connector 24 to detect the USB plug and the IEEE1394 plug being mounted or dismounted.

Figure 3:
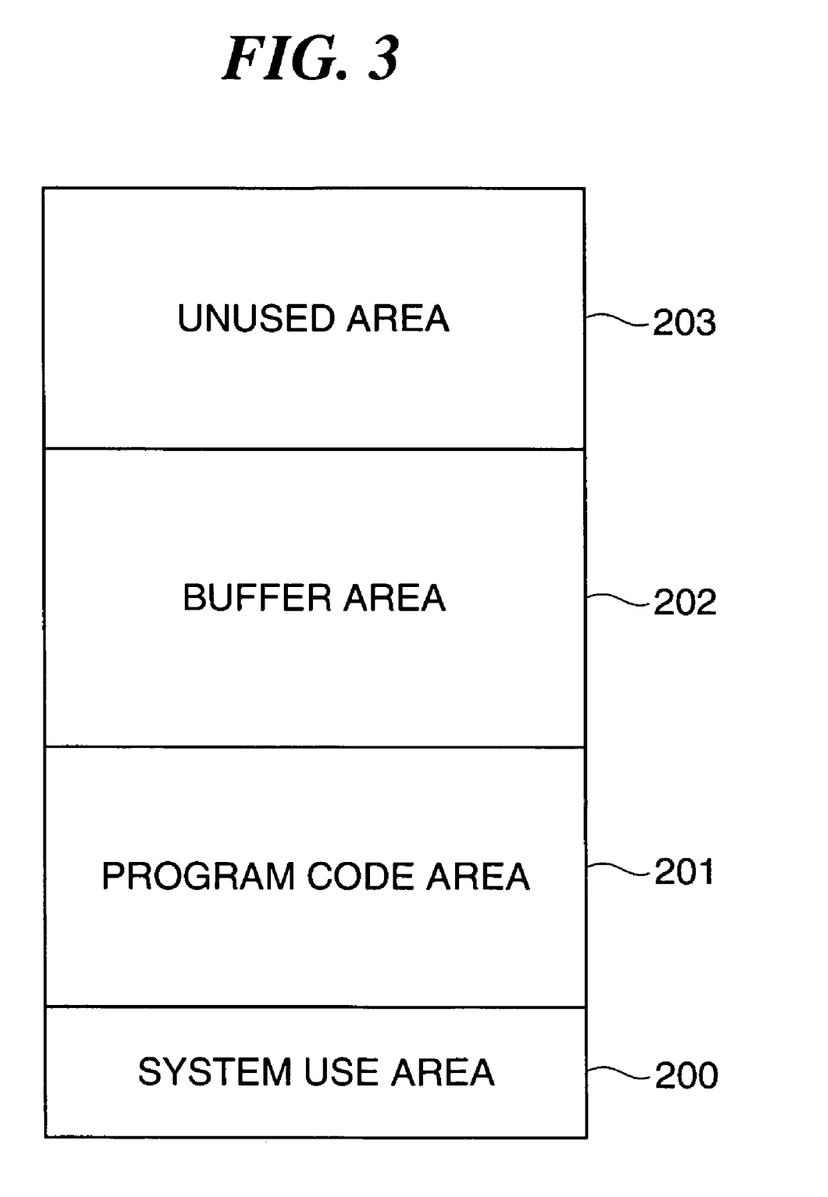
FIG. 3 is a diagram showing a memory map of a DRAM in FIG. 1.

FIG. 3 is a diagram showing a memory map of the DRAM 5 in FIG. 1.

As shown in FIG. 3, the memory map is comprised of a system use area 200, a program code area 201, a buffer area 202, and an unused area 203.

The system use area 200 is used when the system controller circuit 12 executes a program code for controlling the digital camera 100, for example, a heap area or a stack area.

The program code area 201 stores the program code for controlling the digital camera 100.

The buffer area 202 is shared as a working memory by shooting, data communication, search, and other processing. Therefore, the memory capacity necessary for these processing can be reduced and the working memory can be used with efficiency.

When a user inputs a search key image characteristic of desired image data and an instruction for starting the searching process by an input section (not shown), the system controller circuit 12 performs the searching process for desired image data in the following manner: that is, the system controller circuit 12 stores the inputted search key image in the buffer area 202 and then compares at least one search key image stored in the buffer area 202 with a plurality of image data stored in the nonvolatile memory 11 or the memory card 21 to retrieve image data having a high degree of similarity to the search key image stored in the buffer area 202 as a search result image and stores the search result image in the buffer area 202.

Figure 4:
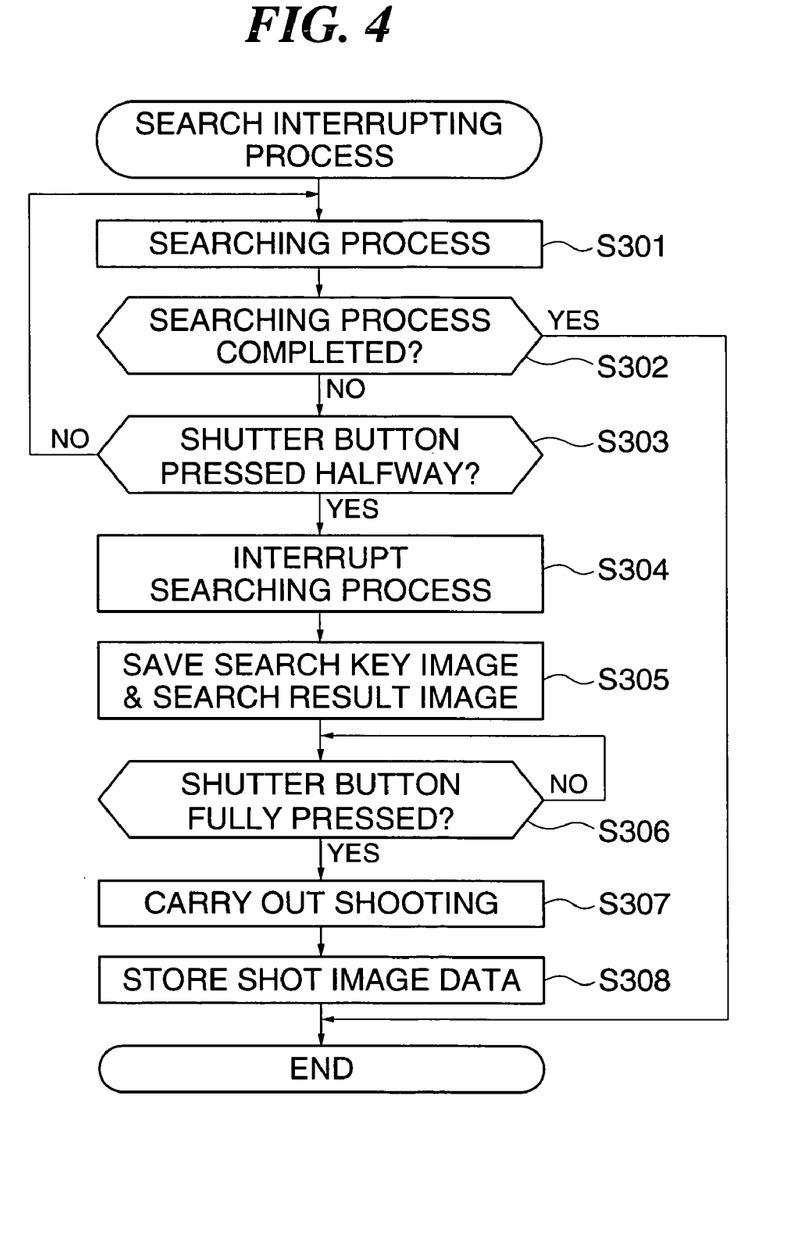
FIG. 4 is a flow chart showing a search interrupting process carried out by the digital camera in FIG. 1.

FIG. 4 is a flow chart showing a search interrupting process carried out by the digital camera 100 in FIG. 1.

As shown in FIG. 4, the system controller circuit 12 sequentially compares at least one search key image stored in the buffer area 202 with a plurality of image data stored in the memory card 21 or in the nonvolatile memory 11, using the buffer area 202 as the working memory, to thereby carry out the searching process (step S301). Then, it is determined whether or not the searching process for all the image data stored in the memory card 21 or in the nonvolatile memory 11 has been completed (step S302). When the searching process for all the image data has been completed, the present process is terminated.

When it is determined in the step S302 that the searching process for all image data has not been completed, the system controller circuit 12 determines whether or not the shutter button 13 has been pressed halfway (step S303). When the shutter button 13 has not been pressed halfway, the process returns to the step S301 where the system controller circuit 12 continues the searching process, whereas when the shutter button 13 has been pressed halfway, the searching process is interrupted so as to use the buffer area for shooting (step S304). Then, saving processing (interruption process) is carried out for saving the search key image and the search result image, which have been stored in the buffer area 202, in the memory card 21 or in the nonvolatile memory 11 (step S305).

Then, when the shutter button 13 is fully pressed (YES to a step S306), the system controller circuit 12 controls the memory controller circuit 4 to store image data outputted from the A/D converter 3 in the buffer area 202 to thereby carry out shooting (step S307).

Here, when the shutter button 13 is kept fully pressed, a continuous shooting is carried out as long as the shutter button 13 is kept fully pressed. The shutter button 13 cannot be fully pressed without being pressed halfway on the way. Therefore, when the shutter button 13 is fully pressed to carry out shooting, first the searching process is interrupted upon detection of the shutter button 13 being pressed halfway, and then the shutter button 13 is detected to have been fully pressed, whereby shooting can be carried out.

Next, the memory controller circuit 4 stores the image data, which has been stored in the buffer area 202 for shooting in the step S307, in the memory card 21 or in the nonvolatile memory 11 (step S308), and then the present process is terminated.

According to the process in FIG. 4, when the shutter button 13 is pressed halfway (YES to the step S303), the searching process is interrupted in order to use the buffer area 202 for shooting (step S304). Then, the saving processing (interruption process) for saving the search key image and the search result image, which have been stored in the buffer area 202, in the memory card 21 or to the nonvolatile memory 11 is executed (step S305). As a result, the searching process for searching data can be quickly interrupted without detecting the user pressing a search interruption button.

Although in the present search interrupting process, when the shutter button 13 is pressed halfway, an interruption start signal for notifying the start of the interruption process is generated (YES to the step S303), the present invention is not limited to the shutter button 13, but it may be configured such that the interruption start signal is generated to interrupt the searching process when the cross key 15 or the shooting mode setting button 14 is pressed. Even with this configuration, the searching process for searching data can be quickly interrupted without detecting the user pressing the search interruption button pressing.

Since the buffer area 202 is shared as the working memory by shooting and the searching process, the memory capacity required to carry out these processing can be reduced and the buffer area 202 can be efficiently used. Moreover, when the searching process is interrupted, information related to the interrupted searching process stored in the buffer area 202 is saved in the memory card 21 or in the nonvolatile memory 11, and the buffer area 202 is used only for the interruption process. As a result, the buffer area 202 can be efficiently used.

Figure 5:
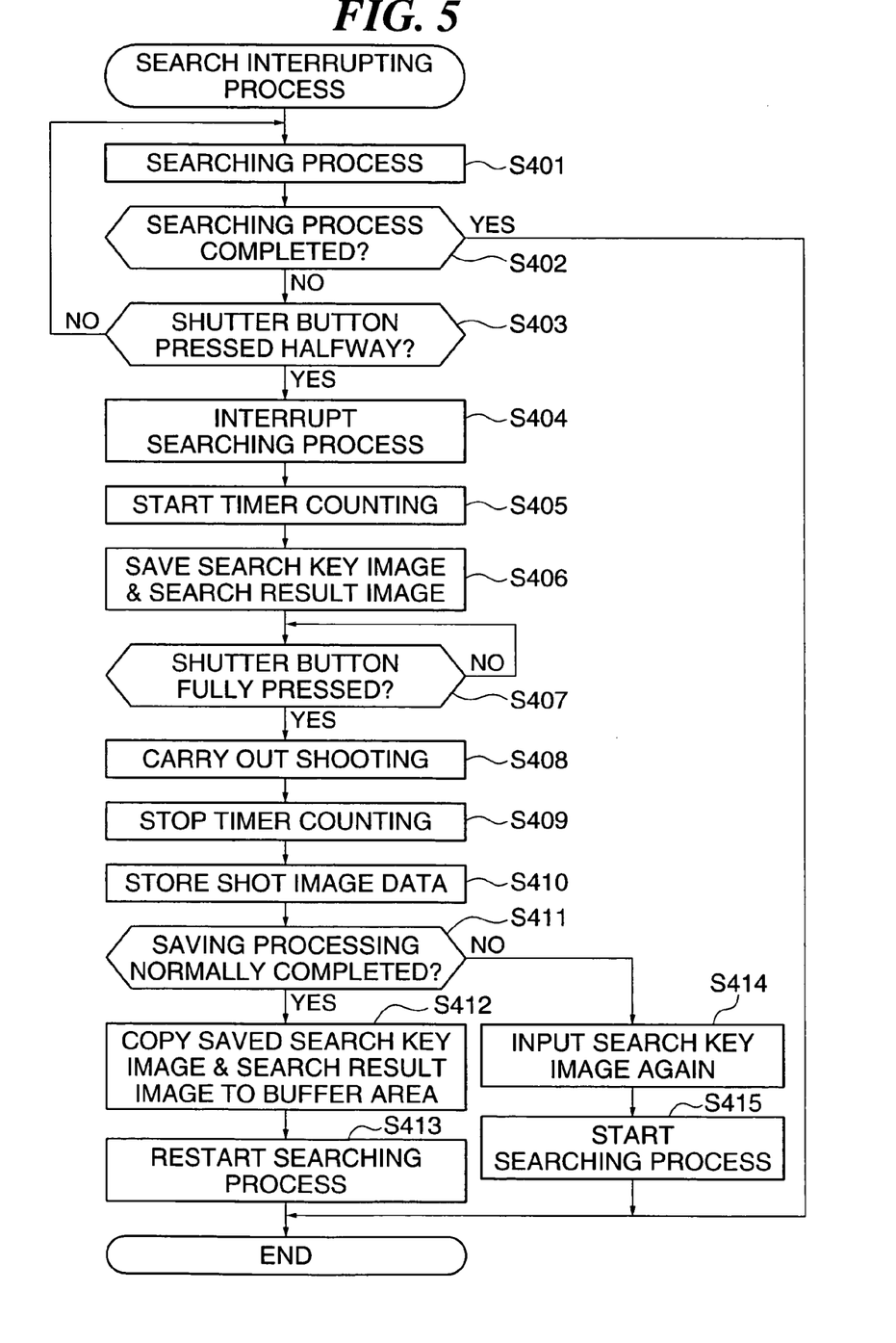
FIG. 5 is a flow chart showing a first variation of the search interrupting process in FIG. 4.

FIG. 5 is a flow chart showing a first variation of the search interrupting process in FIG. 4.

As shown in FIG. 5, the system controller circuit 12 sequentially compares at least one search key image stored in the buffer area 202 with a plurality of image data stored in the memory card 21 or in the nonvolatile memory 11, using the buffer area 202 as the working memory, to thereby carry out the searching process (step S401). Then, it is determined whether or not the searching process for all the image data stored in the memory card 21 or in the nonvolatile memory 11 has been completed (step S402). When the searching process for all the image data has been completed, the present process is terminated.

When it is determined in the step S402 that the searching process for all image data has not been completed, the system controller circuit 12 determines whether or not the shutter button 13 has been pressed halfway (step S403). When the shutter button 13 has not been pressed halfway, the process returns to the step S401 where the system controller circuit 12 continues the searching process, whereas when the shutter button 13 has been pressed halfway, an interruption start signal for notifying the start of an interruption process is generated, and when the interruption start signal is detected, the searching process is interrupted so as to use the buffer area for shooting (step S404).

Next, the system controller circuit 12 starts a timer for counting a period of time elapsed after the shutter button 13 is pressed halfway until the shutter button 13 is fully pressed (step S405). Then, saving processing (interruption process) is carried out for saving the search key image and the search result image, which have been stored in the buffer area 202, in the memory card 21 or in the nonvolatile memory 11 (step S406).

Then, when the shutter button 13 is fully pressed (step S407), the system controller circuit 12 controls the memory controller circuit 4 to store image data outputted from the A/D converter 3 in the buffer area 202 to thereby carry out shooting (step S408). Then, the system controller circuit 12 stops the timer which has been started in the step S405 (step S409), and the memory controller circuit 4 stores the image data, which has been stored in the buffer area 202 for shooting in the step S408, in the memory card 21 or in the nonvolatile memory 11 (step S410).

Next, it is determined whether or not the period of time counted by the timer, which has stopped counting in the step S409, is longer than a predetermined period of time (for example, 1 second) required to carry out the saving processing, whereby it is determined whether or not the saving processing (the processing in the step S406) for all the search key images and search result images, which have been stored in the buffer area 202, has been completed normally (step S411). The above period of time required to carry out the saving processing is calculated based on the use rate of the buffer area 202 or based on the maximum capacity of the buffer area 202 and the maximum transfer speed per unit time of data stored in the buffer area 202 by the system controller circuit 12.

When it is determined in the step S411 that the saving processing for the buffer area 202 executed in the step S406 has been completed normally, the search key image and the search result image, which have been saved in the step S406, are copied from the memory card 21 or from the nonvolatile memory 11 to the buffer area 202 (step S412) in order to restart the searching process, and then the searching process interrupted in the step S404 is restarted (step S413), followed by the present process being terminated.

When it is determined in the step S411 that the saving processing for the buffer area 202 executed in the step S406 has not been completed normally, the search key image is inputted again from the input section (not shown) (step S414) to restart the searching process (step S415), followed by the present process being terminated. When the search key image is stored in the nonvolatile memory 11 or the like, the processing in the step S414 is not required.

According to the process in FIG. 5, it is possible to provide the same effects as the process in FIG. 4.

Since the buffer area 202 is shared as the working memory by shooting and the searching process, the memory capacity required to carry out these processing can be reduced and the buffer area 202 can be efficiently used. Moreover, when the searching process is interrupted, information related to the interrupted searching process stored in the buffer area 202 is saved in the memory card 21 or in the nonvolatile memory 11, and the buffer area 202 is used only for the interruption process. As a result, the buffer area 202 can be efficiently used.

Furthermore, when the saving processing for the buffer area 202 has been completed normally, the shot image data is stored in the memory card 21 or in the nonvolatile memory 11 and then the search key image and the search result image, which haven been saved, are returned to the buffer area 202. As a result, the interrupted searching process is restarted and hence the searching process for searching data can be quickly restarted without detecting the user pressing the search restart button.

Although in the present search interrupting process, when the shutter button 13 is pressed halfway, the searching process is interrupted and then the interruption process is executed (YES to the step S403), the present invention is not limited to the shutter button 13, but it may be configured such that when the cross key 15 or the shooting mode setting button 14 is pressed, the searching process is interrupted and then the interruption process is executed. Even with this configuration, the searching process for searching data can be quickly interrupted without detecting the user pressing the search interruption button pressing.

Figure 6:
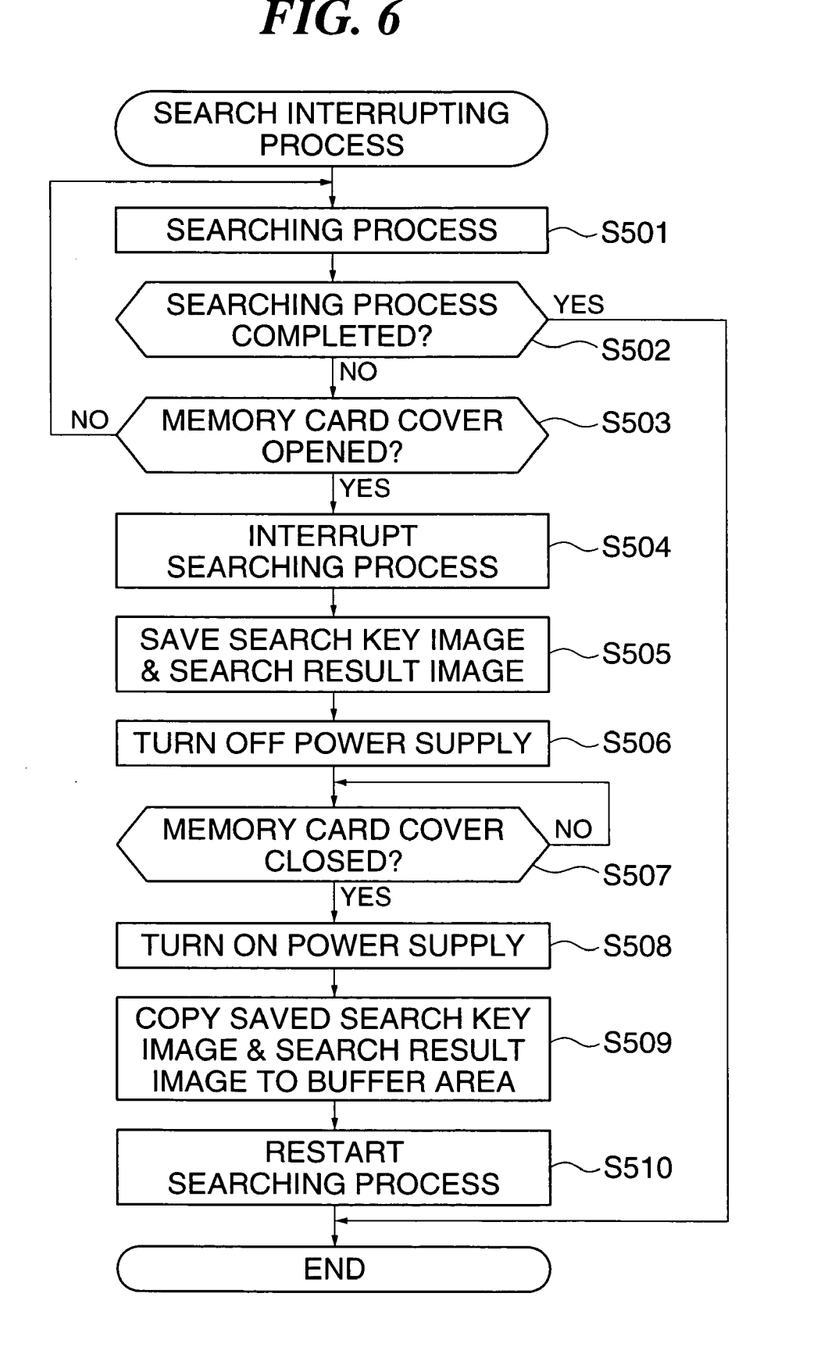
FIG. 6 is a flow chart showing a second variation of the search interrupting process in FIG. 4.

FIG. 6 is a flow chart showing a second variation of the search interrupting process in FIG. 4.

As shown in FIG. 6, the system controller circuit 12 sequentially compares at least one search key image stored in the buffer area 202 with a plurality of image data stored in the memory card 21 or in the nonvolatile memory 11, using the buffer area 202 as the working memory, to thereby execute the searching process (step S501). Then, it is determined whether or not the searching process for all the image data stored in the memory card 21 or in the nonvolatile memory 11 has been completed (step S502). When the searching process for all the image data has been completed, the present process is terminated.

When it is determined in the step S502 that the searching process for all the image data has not been completed, it is determined from an output from the detection switch 32 whether or not the memory card cover 31 has been opened (step S503). When the memory card cover 31 has not been opened, the process returns to the step S501 where the system controller circuit 12 continues the searching process, whereas when the memory card cover 31 has been opened, the searching process is interrupted (step S504).

Next, saving processing (interruption process) is carried out for saving the search key image and the search result image, which have been stored in the buffer area 202, in the memory card 21 or in the nonvolatile memory 11 (step S505), and the power supply of the digital camera 100 is turned off (step S506). When the buffer area 202 is backed up by a battery or the like, the saving processing in the step S505 is not required.

Next, when the memory card 21 is replaced and the memory card cover 31 is closed (YES to a step S507), the power supply of the digital camera 100 is turned on (step S508). To restart the searching process, the search key image and the search result image, which have been saved, are copied from the memory card 21 or from the nonvolatile memory 11 to the buffer area 202 (step S509). Then, the searching process interrupted in the step S504 is restarted (step S510), followed by the present process being terminated.

According to the process in FIG. 6, when the memory card cover 31 is opened (YES to the step S503), the searching process is interrupted (step S504). As a result, the searching process for searching data can be quickly interrupted without detecting the user pressing the search interruption button.

Moreover, when the memory card cover 31 is opened, the power supply of the digital camera 100 is turned off (step S506). Then, when the memory card cover 31 is closed (YES to the step S507), the power supply of the digital camera 100 is turned on (step S508), and the searching process interrupted in the step S504 is restarted (step S510). As a result, the searching process for searching data can be quickly restarted without detecting the user pressing the search restart button.

Although in the present search interrupting process, when the memory card cover 31 is opened (YES to the step S503), the searching process is interrupted (step S504), and the power supply of the digital camera 100 is turned off (step S506), it may be configured such that the searching process is interrupted with the power supply of the digital camera 100 kept on.

Although in the present search interrupting process, when the memory card cover 31 is opened, the searching process is interrupted (step S504), the present invention is not limited to the memory card cover 31, but it may be configured such that the searching process is interrupted when a battery cover is opened. Even with this configuration, the searching process for searching data can be quickly interrupted without detecting the user pressing the search interruption button. In this case, measures are provided to prevent the batter from being removed, for example, by keeping a claw that holds the battery in place in a fixed state until the saving processing for the search key image and the search result image is completed, or an auxiliary power supply is provided, in order to protect the search key image and the search result image, which have been stored in the buffer area 202.

Figure 7:
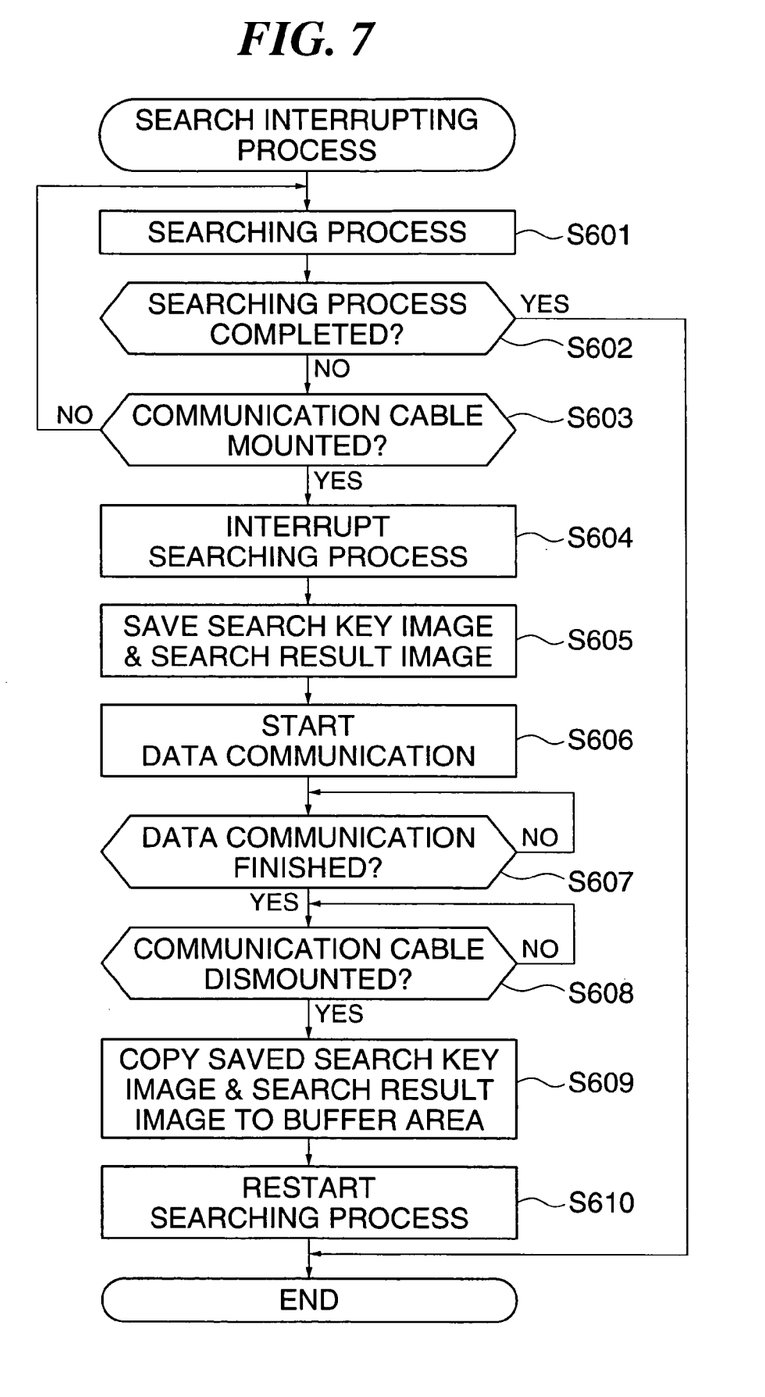
FIG. 7 is a flow chart showing a third variation of the search interrupting process in FIG. 4.

FIG. 7 is a flow chart showing a third variation of the search interrupting process in FIG. 4.

As shown in FIG. 7, the system controller circuit 12 sequentially compares at least one search key image stored in the buffer area 202 with a plurality of image data stored in the memory card 21 or in the nonvolatile memory 11, using the buffer area 202 as the working memory, to thereby carry out the searching process (step S601). Then, it is determined whether or not the searching process for all image data stored in the memory card 21 or in the nonvolatile memory 11 has been completed (step S602). When the searching process for all the image data has been completed, the present process is terminated.

When it is determined in the step S602 that the searching process for all the image data has not been completed, the communication controller 22 detects the levels of output and input signals from and to a predetermined pin in the USB connector 23 or in the IEEE1394 connector 24 to thereby determine whether or not the USB cable 33 or the IEEE1394 cable 34 has been mounted (step S603). When the USB cable 33 or the IEEE1394 cable 34 has not been mounted, the process returns to the step S601 where the system controller circuit 12 continues the searching process, whereas when the USB cable 33 or the IEEE1394 cable 34 has been mounted, the system controller circuit 12 interrupts the searching process so as to use the buffer area 202 for data communication (step S604).

Next, the saving processing is carried out for saving the search key image and the search result image, which have been stored in the buffer area 202, in the memory card 21 or in the nonvolatile memory 11 (step S605).

Next, when the data communication is started (step S606) and then is terminated (YES to the step S607) and the USB cable 33 or the IEEE1394 cable 34 is dismounted (YES to the step S608), the search key image and the search result image, which have been saved, are copied from the memory card 21 or from the nonvolatile memory 11 to the buffer area 202 (step S609), in order to restart the searching process. Moreover, the searching process interrupted in the step S604 is restarted (step S610), and the present process is terminated.

According to the process in FIG. 7, when the USB cable 33 or the IEEE1394 cable 34 has been mounted (YES to the step S603), the searching process is interrupted so as to use the buffer area 202 for the data communication (step S604). As a result, the searching process for searching data can be quickly interrupted without detecting the user pressing the search interruption button.

It should be noted that when the data communication is performed without using the buffer area 202, the searching process does not need to be interrupted.

Moreover, when the USB cable 33 or the IEEE1394 cable 34 has been dismounted (YES to the step S608), the searching process interrupted in the step S604 is restarted (step S610). As a result, the searching process for searching data can be quickly restarted without detecting the user pressing the search restart button.

Although in the present search interrupting process, when the USB cable 33 or the IEEE1394 cable 34 has been mounted, the searching process is interrupted so as to use the buffer area 202 for the data communication (step S604), the searching process may be interrupted immediately before the data communication is started. For example, when the USB cable 33 has been mounted, the searching process may be interrupted upon detection of reception of a communication command from a host. Similarly, although in the present search interrupting process, when the USB cable 33 or the IEEE1394 cable 34 has been dismounted, the interrupted searching process is restarted (step S610), it may be configured such that the interrupted searching process is restarted when the data communication has been finished. With this configuration, even when the USB cable 33 or the IEEE1394 cable 34 is mounted, the searching process can be continued so long as the data communication is not performed.

In the present embodiment, the kinds of data searched by the searching process are not limited to image data.

It is to be understood that the object of the present invention may also be accomplished by supplying a system or an apparatus with a storage medium in which a program code for software which realizes the functions of the above described embodiment is stored and by causing a computer (or a CPU or a MPU) of the system or the apparatus to read and execute the program code stored in the storage medium.

In this case, the program code itself read from the storage medium realizes the functions of the above described embodiment, and hence the program code and the storage medium in which the program code is stored constitute the present invention.

Examples of the storage medium for supplying the program code include a floppy (registered trademark) disk, a hard disk, a magneto-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program code may be downloaded via a network.

Further, it is to be understood that the functions of the above described embodiment may be realized not only by executing a program code read out by a computer but also by causing an OS (operating system) or the like which operates on the computer to execute a part or all of the actual operations based on instructions of the program code.

Further, it is to be understood that the functions of the above described embodiment may also be accomplished by writing a program code read out from the storage medium into a memory provided in an expansion board inserted into a computer or in an expansion unit connected to the computer and then by causing a CPU or the like provided in the expansion board or the expansion unit to execute a part or all of the actual operations based on instructions of the program code.

CROSS REFERENCE TO RELATED APPLICATION

This application claims priority from Japanese Patent Application No. 2004-254455 filed Sep. 1, 2004, which is hereby incorporated by reference herein.

What is claimed is:

1. An image pickup apparatus comprising:
a data storage device that stores a plurality of data;
a searching device that carries out a searching process for searching at least one desired data from the plurality of data stored in said data storage device;
a shooting start instructing device that instructs start of shooting;
an operation detecting device that detects an operation on said shooting start instructing device;
an interruption process executing device that is operable when said operation detecting device detects the operation on said shooting start instructing device, to interrupt the searching process carried out by said searching device and execute an interruption process;
an interruption and searching storage device that is shared as a working memory by the interruption process and by the searching process; and
an interruption information storage device that stores interrupted searching process information relating to the interrupted searching process,
wherein said interruption process executing device saves the interrupted searching process information stored in said interruption and searching storage device, in accordance with the interruption of the searching process in response to the operation on said shooting start instructing device, in said interruption information storage device, and uses said interruption and searching storage device for the interruption process.

2. An image pickup apparatus as claimed in claim 1, further comprising:

a saving processing completion determining device that determines whether or not saving processing for saving the interrupted searching process information in said interruption information storage device is completed within a predetermined time;
a copying device that is operable when the saving processing is completed within the predetermined time, to automatically copy the interrupted searching process information saved in said interruption information storage device, to said interruption and searching storage device; and
a restarting device that restarts the interrupted searching process based on the interrupted searching process information copied to said interruption and searching storage device.

3. control method for an image pickup apparatus including a data storage device that stores a plurality of data, a shooting start instructing device that instructs start of shooting, an interruption and searching storage device, and an interruption information storage device, comprising:
a searching step of carrying out a searching process for searching at least one desired data from the plurality of data stored in the data storage device;
an operation detecting step of detecting an operation on the shooting start instructing device; and
an interruption process executing step of interrupting the searching process carried out in said searching step and executing an interruption process when said operation detecting step detects the operation on the shooting start instructing device,
wherein the interruption process and the searching process shares the interruption and searching storage device as a working memory,
wherein the interruption information storage device stores interrupted searching process information relating to the interrupted searching process, and
wherein the interruption process executing step saves the interrupted searching process information stored in the interruption and searching storage device, in accordance with the interruption of the searching process in response to the operation on the shooting start instructing device, in the interruption information storage device, and uses the interruption and searching storage device for the interruption process.

4. A computer-readable medium storing a control program executed by an image pickup apparatus including a data storage device that stores a plurality of data, a shooting start instructing device that instructs start of shooting, an interruption and searching storage device, and an interruption information storage device, the control program comprising:
a searching module for carrying out a searching process for searching at least one desired data from the plurality of data stored in the data storage device;
an operation detecting module for detecting an operation on the shooting start instructing device; and
an interruption process executing module for interrupting the searching process carried out by the searching module and executing an interruption process when the operation detecting module detects the operation on the shooting start instructing device,
wherein the interruption process and the searching process shares the interruption and searching storage device as a working memory,
wherein the interruption information storage device stores interrupted searching process information relating to the interrupted searching process, and wherein the interruption process executing module saves the interrupted searching process information stored in the interruption and searching storage device, in accordance with the interruption of the searching process in response to the operation on the shooting start instructing device, in the interruption information storage device, and uses the interruption and searching storage device for the interruption process.

5. An image pickup apparatus as claimed in claim 1, wherein in the searching process, by comparing a search key image with the plurality of data stored in said data storage device, image data having a high degree of similarity to the search key image is retrieved as a search result image, and the interrupted searching process information is comprised of the search key image and the search result image.

6. An image pickup apparatus as claimed in claim 1, further comprising a restarting device that controls said searching device to restart automatically the searching process after shooting is executed as the interruption process.

7. An image pickup apparatus comprising:
- a data storage device that stores a plurality of data;
- a searching device that carries out a searching process for searching at least one desired data from the plurality of data stored in said data storage device;
- a shooting start instructing device that instructs start of shooting;
- an operation detecting device that detects an operation on said shooting start instructing device;
- an interruption process executing device that is operable when said operation detecting device detects the operation on said shooting start instructing device, to interrupt the searching process carried out by said searching device and execute an interruption process; and
- a restarting device that controls said searching device to automatically restart the searching process after said interruption process executing device executes shooting as the interruption process.

8. An image pickup apparatus as claimed in claim 7, wherein in the searching process, by comparing a search key image with the plurality of data stored in said data storage device, image data having a high degree of similarity to the search key image is retrieved as a search result image.

9. A control method for an image pickup apparatus including a data storage device that stores a plurality of data, and a shooting start instructing device that instructs start of shooting, comprising:
- a searching step of carrying out a searching process for searching at least one desired data from the plurality of data stored in the data storage device;
- an operation detecting step of detecting an operation on the shooting start instructing device;
- an interruption process executing step of interrupting the searching process carried out in said searching step and executing an interruption process when the operation on the shooting start instructing device is detected in said operation detecting step; and
- a restarting step of controlling the searching step to automatically restart the search process after said interruption process executing step executes shooting as the interruption process.

10. A computer-readable storage medium storing a control program executed by an image pickup apparatus including a data storage device that stores a plurality of data, and a shooting start instructing device that instructs start of shooting, the control program comprising:
- a searching module for carrying out a searching process for searching at least one desired data from the plurality of data stored in the data storage device;
- an operation detecting module for detecting an operation on the shooting start instructing device;
- an interruption process executing module for interrupting the searching process carried out by said searching module and executing an interruption process when the operation on the shooting start instructing device is detected by said operation detecting module; and
- a restarting module for controlling said searching module to automatically restart the searching process after said interruption process executing module executes shooting as the interruption process.

* * * * *